United States Patent [19]

Schulz et al.

[11] Patent Number: 4,546,784

[45] Date of Patent: Oct. 15, 1985

[54] DRAG REDUCTION AGENT

[75] Inventors: Donald N. Schulz, Annandale; Ralph M. Kowalik; Jan Bock, both of Bridgewater; John J. Maurer, New Providence, all of N.J.

[73] Assignee: Exxon Research and Engineering Co., Florham Park, N.J.

[21] Appl. No.: 626,020

[22] Filed: Jun. 29, 1984

Related U.S. Application Data

[63] Continuation-in-part of Ser. No. 454,468, Dec. 29, 1982, abandoned.

[51] Int. Cl.$^4$ .................... C08F 220/20; F17D 1/16
[52] U.S. Cl. ...................... 137/13; 523/175; 526/307.5; 526/320
[58] Field of Search .............. 526/307.5, 320; 523/175; 137/13

[56] References Cited

U.S. PATENT DOCUMENTS

| 3,736,288 | 5/1973 | Stratta et al. | 137/13 |
|---|---|---|---|
| 3,820,557 | 6/1974 | Wartman | 137/13 |
| 4,088,622 | 5/1978 | Pearl | 523/175 |
| 4,200,563 | 4/1980 | Komiya | 526/320 |
| 4,263,927 | 4/1981 | Wilski et al. | 137/13 |
| 4,275,183 | 6/1981 | Kuzma | 526/307.5 |
| 4,340,076 | 7/1982 | Weitzen | 137/13 |
| 4,407,321 | 10/1983 | Wilski et al. | 137/13 |

*Primary Examiner*—Harry Wong, Jr.
*Attorney, Agent, or Firm*—Richard E. Nanfeldt

[57] ABSTRACT

The present invention relates to improved drag reduction agents which are water soluble copolymers of acrylamide and alkyl poly(etheroxy)acrylate.

3 Claims, No Drawings

DRAG REDUCTION AGENT

CROSS-REFERENCE TO RELATED APPLICATIONS

This application is a continuation-in-part of U.S. Ser. No. 454,468, filed Dec. 29, 1982, and now abandoned.

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number=mean fluid velocity×pipe diameter÷fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capactities of existing systems. It can also be used to reduce supply pressures, pumping costs, and/or pipe diameters for given flow capacities.

BACKGROUND OF THE INVENTION

High molecular weight water soluble polymers such as polyethylene oxide (PEO), polyacrylamide (PAM) and partially hydrolyzed polyacrylamide (HPAM) have been demonstrated to reduce drag in turbulent flows of aqueous liquids.

The instant invention discloses new efficient drag reduction agents in aqueous liquids which are a novel class of acrylamide copolymers containing nonionic surfactant monomers.

Polymerizable esters of acrylic acid or methacrylic acid with alkyl or alkylaryl poly(ethyleneoxy)ethyl alcohols are disclosed in Dickstein U.S. Pat. No. 4,075,411,

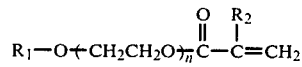

Trecker, U.S. Pat. No. 3,896,161 and British Pat. No. 828,496. Such monomers have found use in the preparation of stable latexes and special textiles.

Copolymers of base-neutralized acrylic acid and nonionic surfactant acrylates have also found use as thickeners for both aqueous solutions and water/organic liquid emulsions (Koenig and Bryant, U.S. Pat. No. 4,268,641). Improved NaCl tolerance is also taught therein. A liquid composition useful as a thickening agent in polymer latexes, comprising a mixture of solvent and a terpolymer of acrylic acid, an ester of the formula of

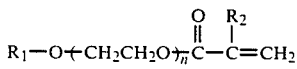

and an alkyl acrylate or methacrylate is claimed in U.S. Pat. No. 4,138,381.

PRESENT INVENTION

The present invention discloses drag reduction agents for aqueous solutions which are copolymers of acrylamide and nonionic surfactant monomers such as

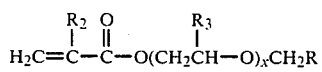

where $R_1$=alkyl, $C_1$-$C_{20}$ more preferably $C_{10}$ to $C_{20}$; aryl, $C_6$-$C_{20}$; alkylaryl, $C_6$-$C_{30}$; and $R_2$=H or $CH_3$; n=1–60 more preferably 5 to 50 and most preferably 8 to 45. These surfactant monomers can be referred to as alkyl poly(etheroxy)acrylates.

The compositions of the instant invention are distinguished from nonionic polyacrylamide homopolymers by their chemical structure.

The present invention is distinct from the acrylic acid salt and nonionic surfactant acrylates of Koenig and Bryant because different comonomers (i.e., acrylamide vs. salts of acrylic acid) and aqueous, rather than hydrocarbon solution polymerization methods, are used. Moreover, the instant copolymers are prepared in a one-step process, i.e., neutralization is not required. Acrylic acid-based polymers are to be avoided because of the known susceptibility of acrylic acid (and its salts) to precipitation by polyvalent cations (e.g., $Ca^{++}$); the latter species are often found in geological formations. (F. J. Glaris in "Water Soluble Resins 2nd Ed", R. L. Davidson and M. Sittig, Eds., Rheinhold, NY, p. 168).

The instant invention describes a novel class of drag reduction agents which are water soluble acrylamide copolymers containing alkyl poly(etheroxy)acrylate groups.

The present invention relates to a method for reducing the frictional drag of an aqueous solution flowing through a pipe, hose or conduit having a continuous bore therethrough, wherein the method comprises adding about 10 to about 2,000 ppms of water soluble copolymer of acrylamide and alkyl poly(etheroxy)acrylate to the aqueous solution flowing through the pipe, conduit or hose, wherein the aqueous solution can be water or up to a 15 wt.% solution of an acid, base or salt. A major application of the instant invention is the injection of the copolymer of the instant invention into a hose being used in a firefighting application, wherein the reduction in friction drag increases the exit pressure of the water from the hose at a given constant input pressure thereby providing a greater length of thrust of the water. This enables the water to be propelled to greater heights and longer lengths by the firefighters.

SUMMARY OF THE INVENTION

The present invention relates to a method for reducing the frictional drag of aqueous solutions which comprises adding about 10 to about 2,000 ppm, more preferably about 30 to 1,000 and most preferably 50 to 500 ppms of a copolymer to the aqueous solution wherein said copolymer comprises water soluble copolymers of acrylamide and alkyl poly(etheroxy)acrylate which are formed by a free radical copolymerization process. The copolymers are prepared by adding the acrylamide monomer and alkyl poly(etheroxy)acrylate monomer to deoxygenated water under a nitrogen purge; the polymerization solution is then heated to sufficient temperature to activate the initiator; free radical initiator is then added to the polymerization solution to initiate polymerization; the acrylamide monomer and alkyl poly(etheroxy)acrylate monomer are polymerized for a sufficient time and at a sufficient temperature to form the water soluble copolymer of acrylamide and alkyl poly(etheroxy)acrylate; and the formed water soluble copolymer is recovered from the polymerization solution. These water soluble copolymers of acrylamide and alkyl poly(etheroxy)acrylate are excellent drag reduction agents for aqueous solutions.

GENERAL DESCRIPTION

The present invention relates to a method for reducing the frictional drag of an aqueous solution flowing through a pipe, hose or conduit having a continuous bore therethrough, wherein the method comprises adding about 10 to about 2,000 ppms of a water soluble copolymer of acrylamide and alkyl poly(etheroxy)acrylate to the aqueous solution through the pipe, conduit or hose.

The water soluble copolymers of acrylamide and alkyl poly(etheroxy)acrylate of the present invention are formed by a free radical copolymerization process in an aqueous medium. These water soluble copolymers of acrylamide and alkyl poly(etheroxy)acrylate are useful as drag reduction agents in aqueous solutions.

The free radical copolymerization process used to form these water soluble copolymers of acrylamide and alkyl poly(etheroxy)acrylate comprises adding acrylamide monomer to deoxygenated water under a nitrogen atmosphere; adding alkyl poly(etheroxy)acrylate monomer to the solution of water and acrylamide monomer to form the polymerization solution; heating the polymerization solution to at least 25° C.; adding free radical initiator to the polymerization solution to cause initiation of the copolymerization of the acrylamide monomer and the alkyl poly(etheroxy)acrylate monomer; copolymerizing the acrylamide monomer and alkyl poly(etheroxy)acrylate monomer at about 25° C. for at least 0.5 hours to form the water soluble copolymer of acrylamide and alkyl poly(etheroxy)acrylate; and recovering by precipitation the formed water soluble copolymer of acrylamide and alkyl poly(etheroxy)acrylate from the polymerization solution.

The water soluble copolymers of acrylamide and alkyl poly(etheroxy)acrylate can be represented by the formula:

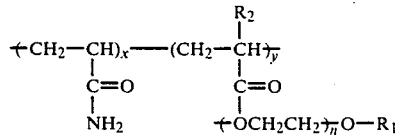

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or a methyl group, n is about 1 to about 60, more preferably about 5 to about 50, and most preferably about 8 to about 45; y is about 0.01 to about 5.00 mol.%, more preferably about 0.04 to about 3.0, and most preferably about 0.1 to about 1.5; and x is about 95.00 to about 99.99 mole %, more preferably about 97.0 to about 99.96 and most preferably about 98.5 to about 99.9. Typical, but nonlimiting examples of preferred R groups are methyl, dodecyl, phenyl and nonylphenyl.

The molecular weight, as derived from intrinsic viscosity, of the water soluble copolymers of acrylamide and alkyl poly(etheroxy)acrylate is about 1 to about 25, more preferably about 2 to about 20, and most preferably about 3 to about 30. The polymer molecular weight is related to the molecular weight by the Mark Houwink relationship $[\eta]=K\overline{M}_v{}^a$.

Suitable alkyl poly(etheroxy)acrylate monomers useful in the preparation of the water soluble copolymers of the instant invention are methyl, dodecyl, phenyl, octylphenyl, and nonylphenyl.

Suitable free radical initiators for the instant free radical copolymerization process are potassium persulfate, AIBN, $H_2O_2$, and $H_2O_2/Fe$ and $H_2O_2/Ce$ (IV). The concentration of the free radical initiator is about 0.01 to about 0.05 grams per 100 grams of the acrylamide monomer and alkyl poly(etheroxy)acrylate monomer.

The concentration of the acrylamide monomer ad alkyl poly(etheroxy)monomers in the aqueous polymerization solution is about 1 to about 20 grams of acrylamide monomer and alkyl poly(etheroxy)monomer per 100 grams of water, more preferably about 3 to about 15, and most preferably about 6 to about 10. Copolymerization of the acrylamide monomer and alkyl poly(etheroxy)acrylate monomer is effected at a temperature of about 40° to about 65° C., more preferably about 50 to about 60, and most preferably about 50 to about 55 for a period of time of about 1 to about 48 hours, more preferably about 2 to about 30, and most preferably about 4 to about 24.

DESCRIPTION OF THE PREFERRED EMBODIMENTS

The following examples illustrate the present invention without, however, limiting the same hereto.

EXAMPLE 1

Copolymerization of Acrylamide with Alkyl Poly(Etheroxy)Acrylates (R(PEO)AC)

A 500 ml quantity of distilled water was added to a 1000 ml resin flask equipped with a water condenser, thermometer, mechanical stirrer, as well as a nitrogen inlet and outlet. Nitrogen was bubbled through the solution for 15 to 30 minutes. The acrylamide (AM) monomer (0.21 to 0.4/mol) and alkyl poly(etheroxy)acrylate (R(PEO)AC) monomer ($1.2-8.5\times10^{-3}$ mol) were charged to the flask. The solution was heated by an oil bath under nitrogen purge at 50° C. for 1 hour. After this period of time, the $K_2S_2O_8$ initiator (0.01 grams) was added and the temperature maintained at 50° to 55° C. under nitrogen for about 18.5 to 19 hours (Conversion 70 to 95%). Polymers were purified by precipitation or dialysis techniques. Polymers were dried by vacuum or freeze drying. Table I describes copolymers prepared according to this Example. The surfactant acrylate content is indicated as mole% of monomer charge.

TABLE I

| Polymer | Polymer Type | R— | Type (PEO) | HLB[1] | AM[2] Mol | Comonomer Mol × 10⁻³ | Mole % Comonomer | $H_2O$ MT | $H_2S_2O_8$ g | [η] 2% NaCl |
|---|---|---|---|---|---|---|---|---|---|---|
| 9595-50P | PAM—CO— R-(PEO)ₙAc | $C_9H_{19}Ph$ | 40 | 17.8 | .42 | 1.23 | .3 | 500 | .01 | 3.3 |
| 9595-10P | PAM—CO— R-(PEO)ₙAc | $C_9H_{19}Ph$ | 40 | 17.8 | .42 | 8.5 | 2.0 | 500 | .01 | 6.2 |
| 9595-60 DFD | PAM—CO— R-(PEO)ₙAc | $C_9H_{19}Ph$ | 10 | 13.2 | .21 | 6.9 | 3.2 | 500 | .05 | 3.4 |

[1]HBL = Hydrophile-Lipophile Balance of the Surfactant
[2]AM = Acrylamide.

EXAMPLE 2

Drag Reduction of Novel Copolymers

Drag reduction effectiveness was evaluated by flowing polymer/distilled water solutions through a 2.13 mm inside diameter stainless steel tube and measuring the resulting frictional pressure drop. Flows were generated by first loading a bladder accumulator with a previously dissolved polymer/distilled water solution and then discharging the solution through the tube test section. The bladder accumulator used (Greer-Olaer Model 30A—2½) is a 10 pressure vessel which contains an inflatable rubber bladder, a port for loading and discharging gas from the inside of the bladder and a port for loading and discharging liquid solutions from the space between the bladder and the interior vessel walls. To load the vessel with liquid, the bladder was first expanded with nitrogen gas such that the bladder filled the inside of the vessel. The liquid solution was then siphoned into the vessel as the bladder was evacuated. Subsequent charging of the vessel with nitrogen gas produced a flow of liquid which was directed to the 2.13 mm diameter tube. Pressure drops were measured across a 48 cm straight segment of the tube with a pair of flush mounted tube wall pressure taps and a differential pressure transmitter. Flow rates were measured by weighing samples of the effluent liquid collected over measured time periods.

Flow rates in the drag reduction experiments ranged from about 8 to 20 g/s; these correspond to solvent Reynolds numbers from about 5000 to 13,000 (solvent Reynolds number = mean flow velocity × tube diameter ÷ solvent kinematic viscosity). Drag reduction was measured by comparing pressure drops of the polymer/distilled water solutions with pressure drops of the distilled water solvent at equal flow rates. Results were expressed as percent drag reduction which is defined as follows:

Percent Drag Reduction =

$$\frac{\text{Pressure Drop (Solvent)} - \text{Pressure Drop (Solution)}}{\text{Pressure Drop (Solvent)}} \times 100$$

Typical drag reduction results from experiments with several novel acrylamide copolymer solutions are given in Table II. Significant drag reduction was observed for all listed solutions. Additional data relating pressure drops to solvent Reynolds numbers are given in FIG. 1; sample numbers in this figure correspond to those in Table II.

TABLE II

| | Drag Reduction Data | | |
|---|---|---|---|
| Sample | Polymer | Concentration (WPPM) | Solvent Reynolds Number | Drag Reduction (%) |
| 1 | 9595-60DFD | 63 | 8300 | 16.7 |
| 2 | 9595-10P | 89 | 7700 | 26.1 |
| 3 | 9595-50P | 89 | 3200 | 61.5 |
| 4 | 9595-50P | 25 | 8300 | 54.7 |

What is claimed is:

1. A method for reducing the frictional drag of an aqueous solution flowing through a pipe, hose or conduit, having a continuous bore therethrough, said method consisting of adding about 10 to about 2000 ppms of a copolymer of acrylamide/alkyl poly(etheroxy)acrylate to said aqueous solution, wherein said copolymer is water soluble and said copolymer has the formula consisting of:

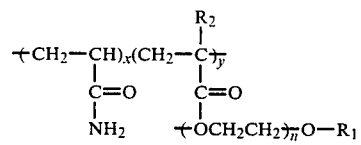

wherein $R_1$ is selected from the group consisting of $C_1$ to $C_{20}$ alkyl groups, $C_6$ to $C_{20}$ aryl groups and $C_6$ to $C_{30}$ alkylaryl groups, $R_2$ is hydrogen or methyl group, n is about 8 to 45, y is about 0.01 to about 5.00 mole %, and x is about 95.00 to about 99.99 mole %.

2. A method according to claim 1 wherein said $R_1$ is an alkyl group having about 10 to about 20 carbon atoms and n is about 5 to about 60.

3. A method according to claim 1 wherein n is about 8 to about 45, y is about 0.04 to about 3.0 mole % and x is about 97.0 to about 99.96 mole %.

* * * * *